United States Patent
Li et al.

(10) Patent No.: US 8,930,932 B2
(45) Date of Patent: Jan. 6, 2015

(54) IN-SERVICE SOFTWARE PATCH

(71) Applicant: Futurewei Technologies, Inc., Plano, TX (US)

(72) Inventors: Ming Li, Cupertino, CA (US); Xiaoyong Yi, Fremont, CA (US); Weiqian Dai, San Jose, CA (US); Raymond Z. L. Ye, San Jose, CA (US); Sam K. Aldrin, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 136 days.

(21) Appl. No.: 13/647,629

(22) Filed: Oct. 9, 2012

(65) Prior Publication Data
US 2014/0101651 A1    Apr. 10, 2014

(51) Int. Cl.
*G06F 9/445* (2006.01)
(52) U.S. Cl.
USPC ............................................ 717/168; 717/178
(58) Field of Classification Search
None
See application file for complete search history.

(56) References Cited

U.S. PATENT DOCUMENTS

| | | | |
|---|---|---|---|
| 5,274,808 A | 12/1993 | Miyao et al. | |
| 6,223,291 B1 | 4/2001 | Puhl et al. | |
| 6,282,709 B1 | 8/2001 | Reha et al. | |
| 6,463,534 B1 | 10/2002 | Geiger et al. | |
| 6,526,574 B1 | 2/2003 | Jones | |
| 6,760,908 B2 | 7/2004 | Ren | |
| 6,918,110 B2 | 7/2005 | Hundt et al. | |
| 7,076,400 B2 | 7/2006 | Duhlberg et al. | |
| 7,107,329 B1 | 9/2006 | Schroder et al. | |
| 7,458,074 B2 | 11/2008 | Dull, III et al. | |
| 7,742,999 B2 | 6/2010 | Moran et al. | |
| 7,779,401 B2 | 8/2010 | Scian et al. | |
| 7,802,092 B1 | 9/2010 | Kelly et al. | |
| 2003/0080988 A1 | 5/2003 | Moran et al. | |
| 2003/0083941 A1 | 5/2003 | Moran et al. | |
| 2005/0289265 A1* | 12/2005 | Illowsky et al. | 710/104 |
| 2006/0041488 A1 | 2/2006 | O'Reirdon et al. | |
| 2007/0180088 A1 | 8/2007 | Zhao | |
| 2008/0033604 A1 | 2/2008 | Margolin | |
| 2008/0301282 A1 | 12/2008 | Coleman | |
| 2010/0085597 A1 | 4/2010 | Vulugundam | |
| 2012/0198038 A1 | 8/2012 | Porter et al. | |
| 2012/0198050 A1 | 8/2012 | Maki et al. | |

* cited by examiner

*Primary Examiner* — Chuck Kendall
(74) *Attorney, Agent, or Firm* — Conley Rose, P.C.; Grant Rodolph; Brandt D. Howell

(57) ABSTRACT

A method in a network device with a processor that runs multiple software threads for software that needs an update for updating the software while mitigating service disruption, the method comprising installing at least one new function, modifying at least one existing function to point to a synchronization code, wherein the synchronization code indicates whether the multiple software threads use the at least one new function or the at least one existing function, synchronizing software threads in the network device, based on the synchronization code indicating that the synchronization of the software threads is not complete, using, by the multiple software threads, the at least one existing function, and based on the synchronization code indicating that the synchronization of the software threads is complete, using, by the multiple software threads, the at least one new function, wherein the multiple software threads continually run on the network device during the synchronization.

18 Claims, 8 Drawing Sheets

IN-SERVICE SOFTWARE PATCH

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Software is a collection of computer programs (or code) and related data that provides instructions for telling a computer or processor what to do and how to do it. It is quite common for an enterprise to continue to develop and improve a software product even after it has been released. Improvements and correction of flaws require that the code and/or data for a software product be upgraded to implement the improvements. Software upgrades may be considered to be of one of two types: major upgrades and minor upgrades. Major upgrades may include changes or upgrades to the entire software product, while minor upgrades may only add one or two new features and may only involve replacing a few functions or a few lines of code. Upgrades may take a significant amount of time to implement on a computer and the particular software being updated may not be available for use by a user during the upgrade process.

SUMMARY

In one embodiment, the disclosure includes a method in a network device with a processor that runs multiple software threads for a software application that needs an upgrade or patch for updating the software while attempting to achieve minimal service disruption, the method comprising installing at least one new function, modifying at least one existing function to point to a synchronization code, wherein the synchronization code indicates whether the multiple software threads use the at least one new function or the at least one existing function, synchronizing software threads in the network device, based on the synchronization code indicating that the synchronization of the software threads is not complete, using, by the multiple software threads, the at least one existing function, and based on the synchronization code indicating that the synchronization of the software threads is complete, using, by the multiple software threads, the at least one new function, wherein the multiple software threads continually run on the network device during the synchronization.

In another embodiment, the disclosure includes a method in a network device with a processor that runs multiple threads for a software application that needs an update or patch for updating the software while attempting to achieve minimal service disruption, the method comprising, comprising installing with a processor a plurality of new functions in a storage component, wherein each of the plurality of new functions corresponds to a respective one of a plurality of existing functions that are to be replaced, creating with a processor a thread coordination zone to direct each of a plurality of software threads as to which of the plurality of new functions and the plurality of existing functions to use during a loop, wherein the plurality of software threads are continuous looping software threads, modifying with a processor each of the plurality of existing functions to jump to the thread coordination zone, and synchronizing with a processor the plurality of software threads, wherein the thread coordination zone directs each of the plurality of software threads to use the plurality of existing functions before synchronization is complete, wherein the thread coordination zone directs each of the plurality of software threads to use the plurality of new functions after synchronization is complete, and wherein the plurality of software threads are not stopped from executing during updating the software.

In another embodiment, the disclosure includes a computer program product in a computer readable media for updating a software application that runs as multiple threads on a processor on a network device, comprising a set of computer instructions stored on a non-transitory computer readable medium that when executed by a processor installs new functions on the network device to replace existing functions on the network device, creates a thread coordination zone comprising the new functions, the existing functions, and a synchronization code, wherein the synchronization code indicates a synchronization status, synchronizes the multiple software threads to run either the existing functions or the new functions, and maintains the synchronization code to indicate whether synchronization is complete, wherein the software threads use the existing functions before the synchronization is complete, wherein the software threads use the new functions after the synchronization is complete, and wherein the multiple software threads continually run on the network device during the synchronization.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In the modern routing and switching systems, the data plane software may run in multiple-core and/or multiple-thread environments. Software patches may be used to fix software bugs (i.e., software problems). The software patches may need to replace the bugged functions with new functions, but may not need to upgrade the entire software. As used herein, the terms "bug" or "bugged" does not necessarily imply that there is a problem with the code for the bugged function. The terms "bug" or "bugged" may mean that the bugged function or code is old, existing, or otherwise former function or code. In fact, the upgrade or patch may simply be a more efficient code from the previous version or it may add additional features not previously available. As such, the terms "bug", "bugged", "old", or other similar language, are used herein interchangeably and typically refer to the "existing" or "previous" version of code, but not necessarily to any particular problem. Likewise, the terms "upgrade", "patch", "update" or the like, are used herein interchangeably and usually refer to the "new" or "replacement" code.

During a software patch installation, it may be desirable to achieve minimal service disruption. One type of multiple-core software patch mechanism for the data plane requires that all of threads in all of cores be stopped during the software patch installation process. Stopping all of the threads may cause a long service disruption, especially in presence of a large number of threads and/or cores.

Figure 1:
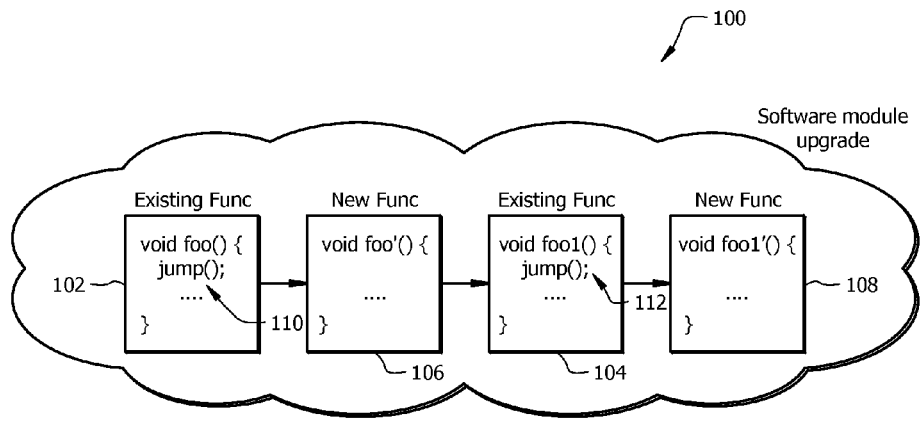
FIG. 1 is a schematic diagram illustrating the results of a software module upgrade method.

FIG. 1 is a diagram illustrating the results of a software module upgrade method 100. The method may upgrade software from existing functions 102, 104 to new functions 106, 108. The method 100 may insert a jump command 110, 112 to instruct existing functions void foo( ) 102 and void foo1( ) 104 to jump to and use new functions void foo'( ) 106 and void foo1'( ) 108, respectively.

Figure 2:
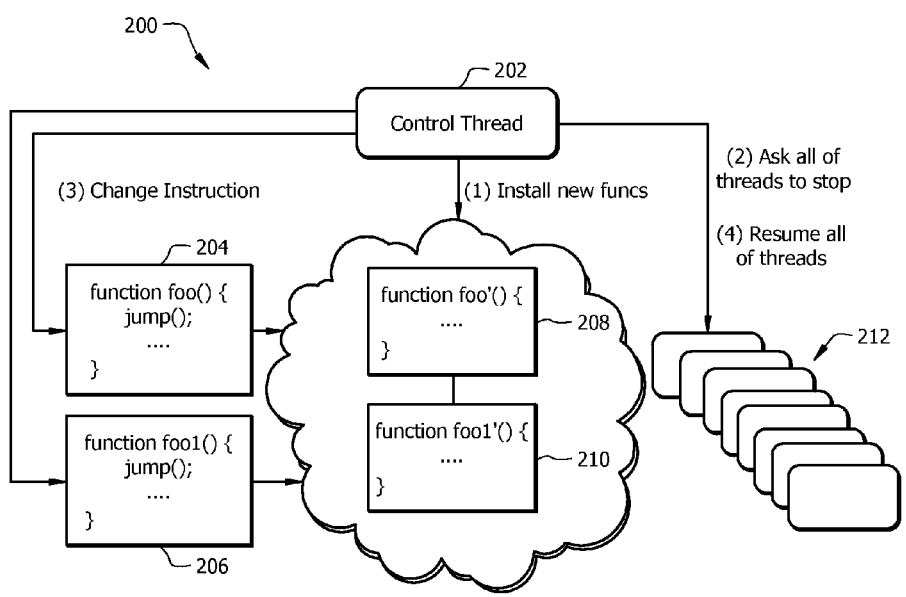
FIG. 2 is a schematic diagram illustrating the steps of an existing software patch method for installing a new software patch.

FIG. 2 is a diagram illustrating the steps of an existing software patch method 200 for installing a new software patch. At step (1), a control thread 202 may install new functions 208, 210. Next, at step (2), the control thread 202 may instruct all of the threads 212 to stop at the starting point of the next loop (in the data plane, each thread may run an infinitive loop). At step (3), the control thread 202 may change the instructions such that the existing or bugged functions 204, 206 point to the new functions 208, 210. The patch control thread may replace the bugged function 204, 206 by modifying the first instruction of the bugged function 204, 206 to jump to the new function 208, 210 after all of threads have stopped. At step (4), the control thread 202 may instruct the threads 212 to resume using the new functions 208, 210. Thus, as discussed above, the installation of the new software patch results in service disruption during the time that the threads 212 are stopped while the control thread 202 changes the instructions for the old functions 204, 206 to point to the new functions 208, 210. Because each thread 212 runs at different speeds and has different tasks, it may take a long time to stop all of the threads 212 in all of the cores. No thread 212 may service the packets after the stop command is issued. The service is resumed after threads receive the resume command.

Figure 3:
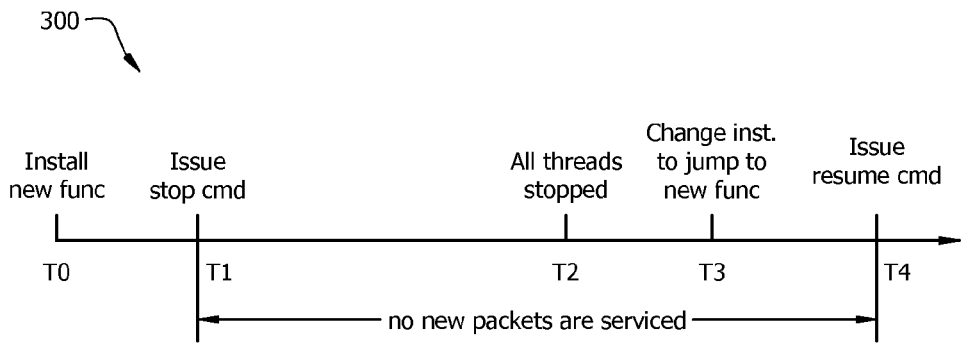
FIG. 3 is a timing diagram illustrating the service disruption caused by the method for installing a new software patch shown in FIG. 2.

FIG. 3 is a timing diagram 300 illustrating the service disruption caused by the software patch installation process described in FIG. 2. At time T0, a new function (i.e., software patch) may be installed. At time T1, a stop command is issued to stop all of the threads. At time T2, all of the threads are stopped. At time T3, a change instruction is issued to instruct the old functions to jump to the new functions. At time T4, a resume command is issued to have all of the threads resume processing. Thus, no new packets may be serviced during the time from T1 to T4.

It is desirable that the software patch installation mechanism meet two basic conditions. First, it is desirable that the software patch be atomic, e.g., when one or multiple functions are patched, it should be determined that all of the threads either run the new functions or run the bugged functions and, on one loop, one thread either runs the new functions or runs the bugged functions. Second, it is desirable to minimize service disruption during the software patch installation process.

Figure 4:
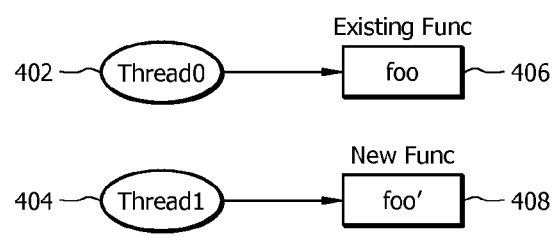
FIG. 4 is a schematic diagram illustrating one embodiment of a software patch upgrade approach that does not meet the condition that the software patch be atomic.
Figure 5:
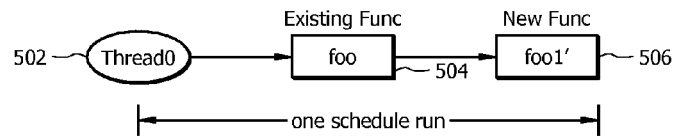
FIG. 5 is a schematic diagram illustrating one embodiment of a software patch upgrade approach that does not meet the condition that the software patch be atomic.

FIGS. 4 and 5 are diagrams illustrating two software patch approaches that do not meet the condition that the software patch be atomic. In FIG. 4, thread0 402 uses bugged function foo 406, but thread1 404 uses the new function foo' 408. However, to meet the condition that the patch be atomic, both thread0 402 and thread1 404 must use either bugged function foo 406 or new function foo' 408. In FIG. 5, thread0 502 uses bugged function foo 504 and new function foo1' 506 during one schedule run. However, to meet the condition that the patch be atomic, thread0 502 must either use all bugged functions foo and foo1 or all new functions foo' and function foo1' during one schedule run and may not mix some old functions with some new functions during one schedule run.

Disclosed herein is a another software patch installation mechanism for the data plane in a multiple-core/multiple-thread environment. With this new mechanism, it is not necessary that the software threads be stopped during a software patch installation. Furthermore, the data packets may continue to be forwarded during the software patch installation process. Therefore, the disclosed software patch installation mechanism may provide for minimal, reduced, or no service disruption.

The disclosed software patch upgrade mechanism may provide in service incremental system upgrade without service disruption. Furthermore, the disclosed mechanism may provide for in-service modular feature addition to a running system. Additionally, the disclosed mechanism may create a quick workaround for problem avoidance until a permanent solution is found. Incremental and modular upgrades to the system may be made using the disclosed software patch upgrade mechanism.

In an embodiment, the disclosed software patch installation mechanism resolves the issue that the patch be atomic by synchronizing the threads. The synchronization does not need to block (i.e., stop) any threads. Therefore, no service disruption may occur. The disclosed software patch upgrade mechanism may be summarized as follows. First, the patch control thread installs the new functions into the system. Second, the patch control thread changes the first instruction of the bugged function to jump to the "bug-hit" zone. The "bug-hit" zone may also be referred herein to as a thread coordination zone. One reason to set a temporary bug-hit zone or thread coordination zone is to let the threads run either the bugged (e.g., old, existing, or former) functions or the new functions, but not both. Before the synchronization is complete, all the threads may run (e.g., use) the bugged functions. After the synchronization is complete, all the threads may run the new function. Thus, all of the threads either use the existing function or the new function. In other words, embodiments require as part of the synchronization process that all threads currently running use only one function, i.e., the existing function or the new function; however, after the sync completes, only the new function will be used. This avoids the problem of some of the software threads using the existing functions while other threads use the new functions as illustrated in FIG. 4 and described above.

The synchronization may be controlled by the patch control thread. Third, the patch control thread tries to synchronize the threads (i.e., the patch control thread may substantially continually check to determine if any thread has hit the bug-hit zone in the thread's current loop). The synchronization may be complete when the patch control thread finds that no thread hits the bugged function in the thread's current loop. The synchronization procedure may be used to guarantee that the software patch upgrade is atomic. Fourth, the patch control thread changes the first instruction of the bugged function again to jump to the new function. After that, all of threads run the new function.

Figure 6:
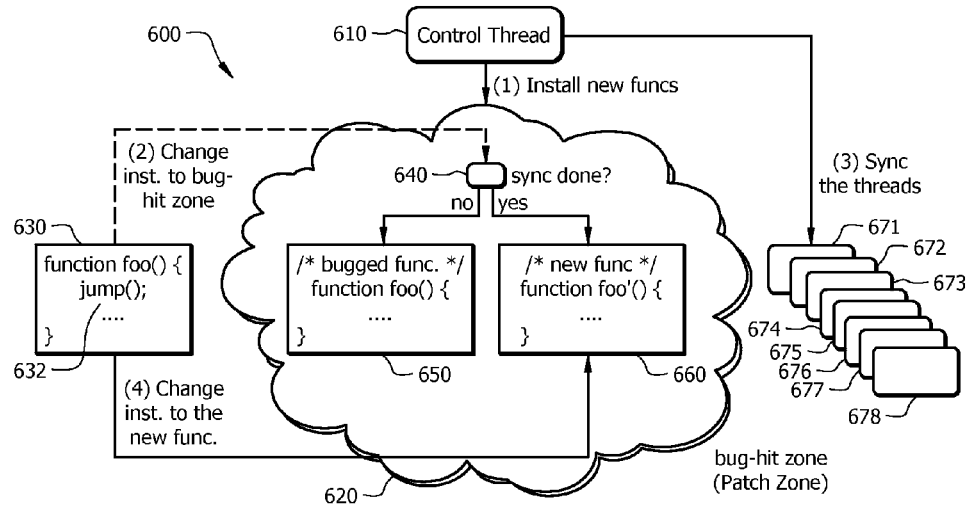
FIG. 6 is a diagram illustrating a system for a software patch upgrade for a network device in accordance with a disclosed embodiment.
Figure 7:
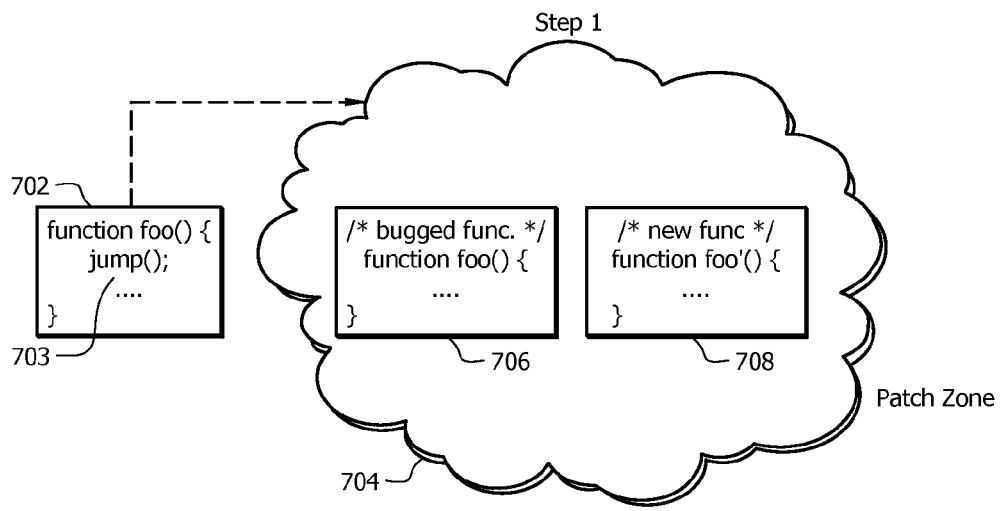
FIGS. 7-12 are diagrams illustrating the steps for a software patch upgrade process in accordance with a disclosed embodiment.
Figure 8:
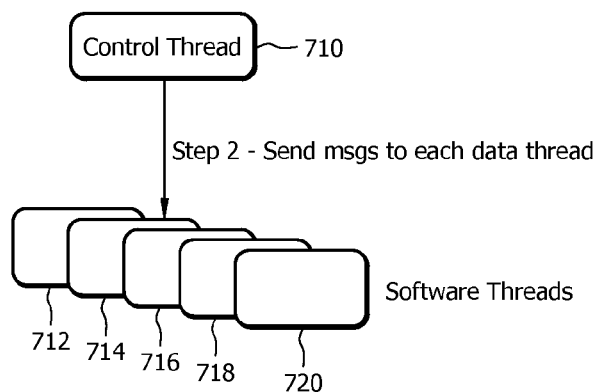
Figure 9:
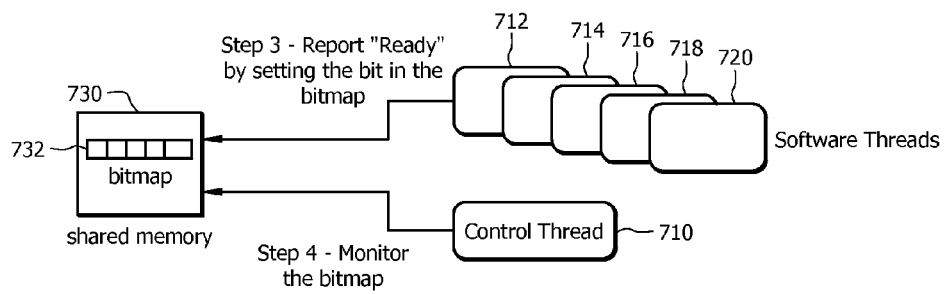

FIG. 6 is a diagram illustrating a system 600 for a software patch upgrade for a network device in accordance with a disclosed embodiment. In an embodiment, the network device may be a router or other device that receives and forwards data packets in a network. System 600 may include a control thread 610, a patch zone 620, existing (bugged) functions 630, and a plurality of software threads 671-678. The control thread 610 may also be referred to herein as a patch control thread. The patch zone 620 may also be referred to herein as a bug-hit zone. The control thread 610 may install a new function 660 into a patch zone 620. The new function 660 may replace or upgrade existing function 630. The patch zone 620 may include a synchronization complete code 640 and the new function 660 that will replace the existing function 630. In an embodiment, the synchronization complete code 640 may be a flag. The patch zone 610 may also include a copy 650 of the existing function 630. The copy 650 of the existing function 630 may not include the first line of the existing function that points to the patch zone. Alternatively, patch zone may point the software threads 671-678 to the next line after the first line in the existing function 630 if synchronization of the software threads 671-678 has not been completed.

The control thread 610 may change the instructions in the existing function 630 such that calls to the existing function 630 will be directed to the patch zone 620. To change the instructions in the existing function 630, the control thread may add a line at the beginning of the existing function 630 or modify the first line of the existing function 630 such that calls to the existing function 630 jump or point to the patch zone 620. The new first line of the existing function 630 may be a jump 632 instruction to jump to the patch zone 620.

The control thread 610 also sends instructions to the software threads 671-678 in order to synchronize the software threads 671-678. Software threads 671-678 may be continuous loop threads such that when the software threads 671-678 finish processing one data packet, the software threads 671-678 may begin at the beginning of the loop to process the next data packet. When one of the software threads 671-678 executes the existing function 630, the software thread 671-678 may jump to the patch zone 620. The software threads 671-678 may read the synchronization complete code 640 to determine whether the synchronization process has been completed. If the synchronization process has not been completed, then the software threads 671-678 use the copy function 650. If the synchronization process has been completed, then the software threads 671-678 use the new function 660. Synchronization of the software threads 671-678 ensures that all of the software threads are pointing to the patch zone before the new function 660 is implemented. This ensures that after synchronization, each of the software threads 671-678 will use the new function 660 on their next loop. Thus, the situation in which some of the software threads 671-678 are using the existing function 630 and some of the software threads 671-678 are using the new function 660 is avoided. Once the software threads 671-678 are synchronized, the first line in the existing function 630 is changed to jump to the new function 660.

FIGS. 7-12 are diagrams illustrating steps for a software patch upgrade process in accordance with a disclosed embodiment. At step 1, shown in FIG. 7, a control thread (not shown in FIG. 7) may download the new functions 708 into a synchronization code zone (e.g., patch zone) 704. An instruction may be added to the first line of an existing or bugged function 702 to jump to a patch zone 704. The patch zone 704 may comprise a copy of the existing (bugged) function 706 (e.g., the existing function 702 without the first line that points to the patch zone) and the new function 708 that will replace the existing function 702. At step 2, shown in FIG. 8, a patch control thread 710 may send messages to each software thread 712, 714, 716, 718, 720 to instruct the threads 712, 714, 716, 718, 720 to flush (i.e., empty or erase) the corresponding level 1/level 2/level 3 (L1/L2/L3) instruction cache. At step 3, shown in FIG. 9, each software thread 712, 714, 716, 718, 720 may report "Ready" to the control thread after the L1/L2/L3 caches are flushed. This report of "Ready" from the software threads 712, 714, 716, 718, 720 may be performed by setting a corresponding bit in bitmap 732 in shared memory 730. At step 4, also shown in FIG. 9, the control thread 710 may monitor the bitmap to determine if all of the software threads 712, 714, 716, 718, 720 have reported "Ready". If yes, then the control thread 710 may start the synchronization process.

Figure 10:
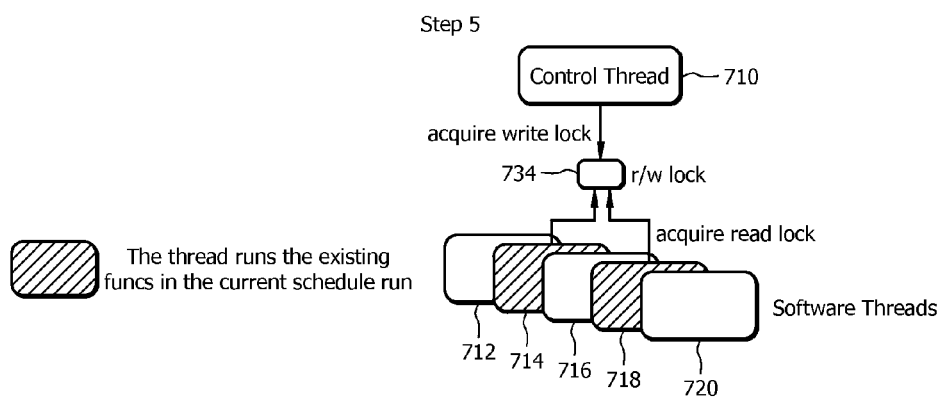

At step 5, shown in FIG. 10, synchronization of the software threads 712, 714, 716, 718, 720 is performed. The synchronization of the software threads 712, 714, 716, 718, 720 may be performed through a read/write lock 734 on a synchronization done flag shared between the control thread 710 and the software threads 712, 714, 716, 718, 720 where the control thread 710 attempts to acquire a write lock while the software threads 712, 714, 716, 718, 720 attempt to acquire a read lock. A software thread 712, 714, 716, 718, 720 may acquire a read lock if it runs the existing functions 706 during a current schedule run. In FIG. 10, software threads 714, 718 may have acquired a read lock while software threads 710, 716, 720 have not acquired a read lock.

Figure 11:
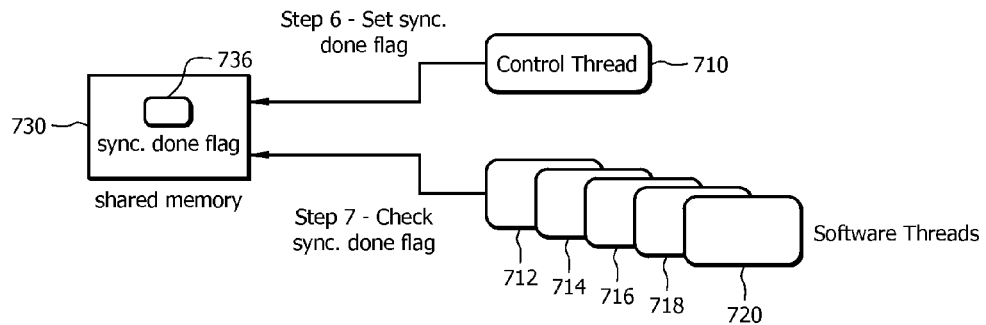
Figure 12:
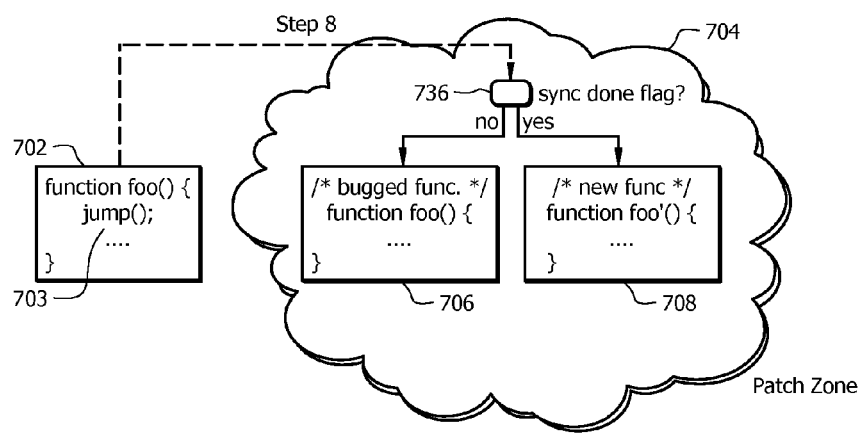

At steps 6 and 7, shown in FIG. 11, the control thread 710 may have acquired the write lock on read/write lock 734. The control thread 710 may acquire the write lock when no software thread 712, 714, 716, 718, 720 has run or is running the existing function in the software thread's 712, 714, 716, 718, 720 current schedule run. After acquiring the write lock on read/write lock 734, at step 6, the control thread 710 may set a synchronization done flag 736 in shared memory 730. At step 7, the software threads 712, 714, 716, 718, 720 may check the synchronization done flag 736 to determine whether to use the existing bugged function 706 or the new function 708. As shown in FIG. 12, at step 8, the software threads 712, 714, 716, 718, 720 may run the copy of the bugged function 706 if the synchronization done flag 736 indicates that synchronization of the software threads 712, 714, 716, 718, 720 is not complete. If the synchronization of the software threads 712, 714, 716, 718, 720 is complete as shown by the synchronization done flag 736, the software threads 712, 714, 716, 718, 720 may use the new function 708. Once the synchronization is complete, the control thread 710 changes the first instruction of the bugged function 702 to jump to the new function 708. After that, all of software threads 712, 714, 716, 718, 720 run the new function 708.

Figure 13:
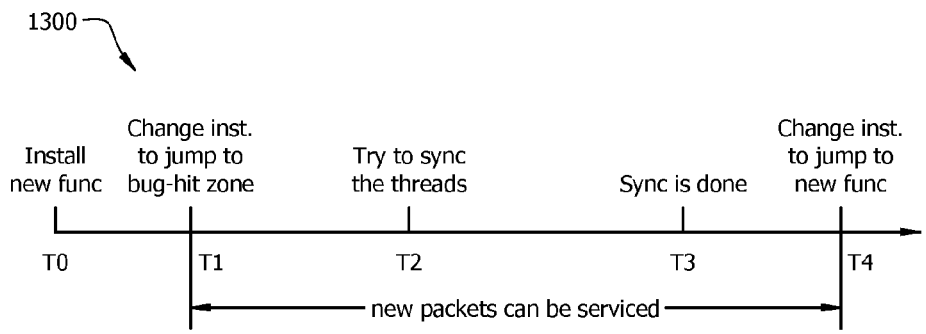
FIG. 13 is a timing diagram illustrating that new packets may be serviced during the software patch upgrade process without service interruption according to a disclosed embodiment.

FIG. 13 is a timing diagram 1300 illustrating that new packets may be serviced during the software patch upgrade process without service interruption according to a disclosed embodiment. At time T0, a new function may be installed on a network unit such as a router. At time T1, the instruction in the existing function is changed to instruct the software threads to jump to the patch zone or bug-hit zone. At time T2, the control thread may begin trying to synchronize the software threads. At time T3, synchronization of the software threads may be complete. At time T4, the control thread may change the instructions in the existing function to jump to the new function. New packets may be serviced during the entire process including times T1 through T. Timing diagram 1300 may be contrasted with the diagram 300 in FIG. 3 that shows that no new packets may be serviced during the same times T1 through T4. Thus, the disclosed mechanisms for software patch upgrades may provide improved data packet servicing over existing methods.

Figure 14:
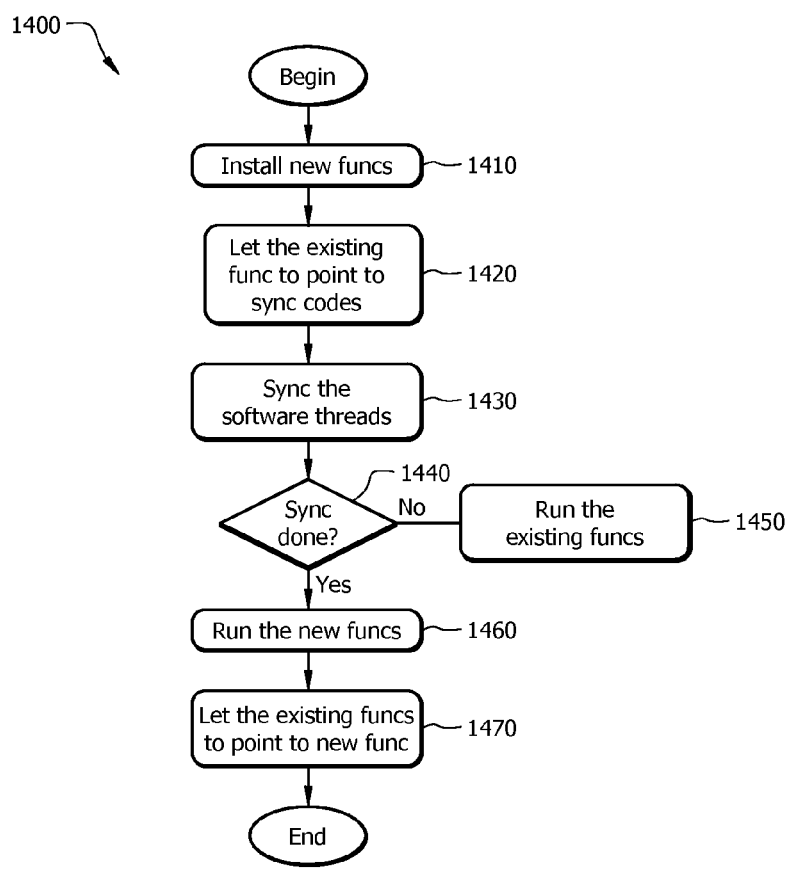
FIG. 14 is a flowchart illustrating a method for providing a software patch upgrade to a network unit in accordance with a disclosed embodiment.

FIG. 14 is a flowchart illustrating a method 1400 for providing a software patch upgrade to a network unit in accordance with a disclosed embodiment. The method 1400 may begin at block 1410 where the new functions 708 that will replace corresponding existing or bugged functions 702 may be installed on the network unit. At block 1420, a control thread may modify the existing functions 702 to point to synchronization codes 736 in a patch zone 704. At block 1430, the control thread 710 may synchronize the software threads 712, 714, 716, 718, 720 in the network unit. At block 1440, the control thread 710 may monitor the software threads 712, 714, 716, 718, 720 and determine whether synchronization has been complete. If the synchronization has not been completed, then at block 1450 the software threads 712, 714, 716, 718, 720 may use the copied existing functions 706. If the synchronization has been completed, then at block 1460 the software threads 712, 714, 716, 718, 720 may use the new functions 708. At block 1470, the control thread 710 may modify the existing functions 703 to point or jump to the new functions 708 after which the method 1400 may end.

Figure 15:
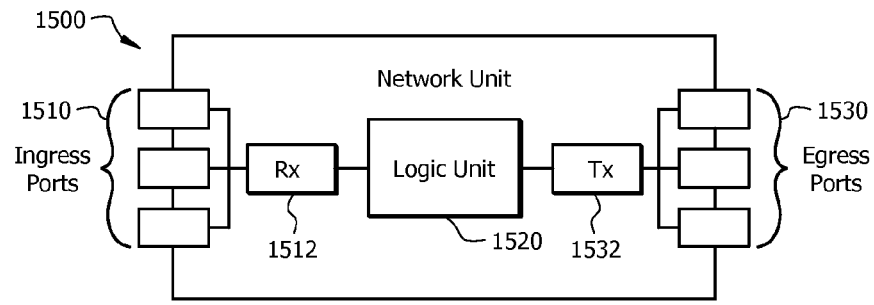
FIG. 15 is a schematic diagram that illustrates an embodiment of a network unit, which may be any device that transports and processes data through the network.

FIG. 15 illustrates an embodiment of a network unit 1500, which may be any device that transports and processes data through the network. For instance, the network unit 1500 may implement system 600. The network unit 1500 may comprise one or more ingress ports or units 1510 coupled to a receiver (Rx) 1512 for receiving signals and frames/data from other network components. The network unit 1500 may comprise a logic unit 1520 to determine which network components to send data to. The logic unit 1520 may be implemented using hardware, software, or both. The logic unit 1520 may comprise one or more processors and one or more of the processors may be multi-core processors. The network unit 1500 may also comprise one or more egress ports or units 1530 coupled to a transmitter (Tx) 1532 for transmitting signals and frames/data to the other network components. The receiver 1512, logic unit 1520, and transmitter 1532 may also implement or support the software patch upgrade method 1400 and the other software patch upgrade mechanisms described above. The components of the network unit 1500 may be arranged as shown in FIG. 15.

Figure 16:
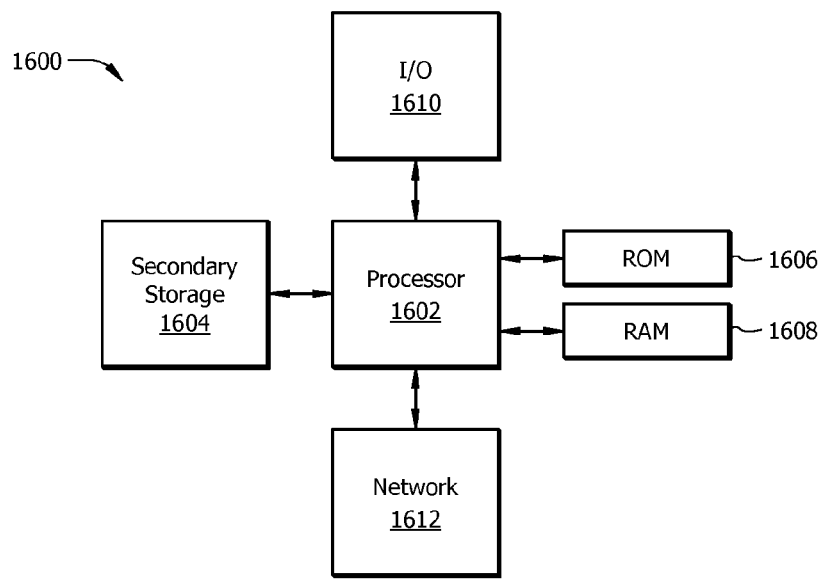
FIG. 16 illustrates a typical, general-purpose network component suitable for implementing one or more embodiments of the components disclosed herein.

The network components and devices described above may be implemented on any general-purpose network component, such as a computer or network component with sufficient processing power, memory resources, and network throughput capability to handle the necessary workload placed upon it. FIG. 16 illustrates a typical, general-purpose network component 1600 suitable for implementing one or more embodiments of the components disclosed herein. The network component 1600 includes a processor 1602 (which may be referred to as a central processor unit or CPU) that is in communication with memory devices including secondary storage 1604, read only memory (ROM) 1606, random access memory (RAM) 1608, input/output (I/O) devices 1610, and network connectivity devices 1612. The processor 1602 may be implemented as one or more CPU chips, or may be part of one or more application-specific integrated circuits (ASICs) or digital signal processors (DSPs).

The secondary storage 1604 is typically comprised of one or more disk drives or tape drives and is used for non-volatile storage of data and as an over-flow data storage device if RAM 1608 is not large enough to hold all working data. Secondary storage 1604 may be used to store programs that are loaded into RAM 1608 when such programs are selected for execution. The ROM 1606 is used to store instructions and perhaps data that are read during program execution. ROM 1606 is a non-volatile memory device that typically has a small memory capacity relative to the larger memory capacity of secondary storage 1604. The RAM 1608 is used to store volatile data and perhaps to store instructions. Access to both ROM 1606 and RAM 1608 is typically faster than to secondary storage 1604. Network component 1600 may implement any of the software patch upgrade methods and systems described above. Network component 1600 may also provide software patch upgrades to a network device such as network unit 1500.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term about means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

We claim:

1. In a network device with a processor that runs multiple software threads for a software application that needs an update or patch, a method for updating the software while attempting to achieve minimal service disruption, the method comprising:
   installing, in a thread coordination zone, at least one new function, at least one copy of at least one existing function, and a synchronization code, wherein the synchronization code indicates whether synchronization of the multiple software threads is complete;
   changing a first instruction in the at least one existing function to jump to the thread coordination zone;
   synchronizing the multiple software threads in the network device;
   based on the synchronization code indicating that the synchronization of the software threads is not complete, using, by the multiple software threads, the at least one copy of the at least one existing function; and
   based on the synchronization code indicating that the synchronization of the software threads is complete, using, by the multiple software threads, the at least one new function,
   wherein the multiple software threads continually run on the network device during the synchronization.

2. The method of claim 1, further comprising modifying the at least one existing function to point to the at least one new function.

3. The method of claim 1, wherein the at least one new function comprises a plurality of new functions and the at least one existing function comprises a plurality of existing functions, and wherein each of the plurality of new functions corresponds to one of the plurality of existing functions.

4. The method of claim 1, wherein synchronizing the multiple software threads comprises checking whether any of the software threads have accessed the synchronization code.

5. The method of claim 1, wherein the multiple software threads are synchronized when no software thread hits the bugged function in the software thread's current loop.

6. The method of claim 1, further comprising changing the first instruction in the at least one existing function to jump to the at least one new function when synchronization of the multiple software threads is complete.

7. The method of claim 1, wherein synchronizing the multiple software threads comprises acquiring with a control thread a write lock on a synchronization flag when none of the multiple software threads has run or is running the existing function in the software thread's current schedule run.

8. In a network device with a processor that runs multiple threads for a software application that needs an upgrade or patch, a method for updating the software while attempting to achieve minimal service disruption, the method comprising:
   installing with a processor a plurality of new functions in a storage component, wherein each of the plurality of new functions corresponds to a respective one of a plurality of existing functions that are to be replaced;
   creating with a processor a thread coordination zone to direct each of a plurality of software threads as to which of the plurality of new functions and the plurality of existing functions to use during a loop, wherein the plurality of software threads are continuous looping software threads;
   modifying with a processor each of the plurality of existing functions to jump to the thread coordination zone; and
   synchronizing with a processor the plurality of software threads,
   wherein the thread coordination zone directs each of the plurality of software threads to use the plurality of existing functions before synchronization is complete,
   wherein the thread coordination zone directs each of the plurality of software threads to use the plurality of new functions after synchronization is complete, and
   wherein the plurality of software threads are not stopped from executing during updating the software.

9. The method of claim 8, wherein the thread coordination zone comprises a synchronization flag to indicate whether synchronization is complete.

10. The method of claim 8, further comprising monitoring with a processor the plurality of software threads to determine whether all of the software threads have hit the thread coordination zone.

11. The method of claim 10, wherein the processor determines that the synchronization is complete when all of the software threads have hit the thread coordination zone.

12. The method of claim 8, modifying with a processor each of the plurality of existing functions to jump to a corresponding one of the plurality of new functions after synchronization is complete.

13. The method of claim 8, further comprising sending a message to each software thread from a patch control thread, wherein the message instructs the software threads to empty a corresponding one of one of a level 1 instruction cache, a level 2 instruction cache, and a level 3 instruction cache.

14. The method of claim 13, further comprising receiving at the patch control thread from each of the software threads a report that the software threads are ready to synchronize.

15. The method of claim 14, further comprising beginning the synchronization of the software threads with the patch control thread.

16. The method of claim 8, wherein synchronizing the plurality of software threads comprises acquiring a write lock of a synchronization flag when none of the software threads has run or is running any of the existing functions in the software thread's current schedule run.

17. A computer program product in a computer readable media for updating a software application that runs as multiple software threads on a processor on a network device, the computer program product comprising one or more computer instructions stored on a non-transitory computer readable medium that when executed by a processor cause a network device to:

install one or more new functions on the network device to replace existing functions on the network device;

create a thread coordination zone comprising the new functions, the existing functions, and a synchronization code, wherein the synchronization code indicates a synchronization status;

synchronize the multiple software threads to run either the existing functions or the new functions, and maintain the synchronization code to indicate whether synchronization is complete, wherein the multiple software threads use the existing functions before the synchronization is complete, wherein the multiple software threads use the new functions after the synchronization is complete, wherein the multiple software threads continually run on the network device during the synchronization, and wherein the one or more computer instructions when executed by the processor cause the network device to change a first line in each of the existing functions to jump to corresponding ones of the new functions after synchronizing the multiple software threads.

18. The computer program product of claim 17, wherein the one or more computer instructions when executed by the processor cause the network device to change the first line in each of the existing functions to jump to the thread coordination zone before synchronizing the multiple software threads.

* * * * *